(12) United States Patent
Myers

(10) Patent No.: US 8,770,885 B2
(45) Date of Patent: Jul. 8, 2014

(54) WEDGE CLAMP

(75) Inventor: Philip Allen Myers, Oak Ridge, NC (US)

(73) Assignee: Melvin L. Myers, Flowery Branch, GA (US), part interest ( * ) Notice: Subject to any disclaimer, the term of this patent is extended or adjusted under 35 U.S.C. 154(b) by 130 days.

(21) Appl. No.: 12/800,944

(22) Filed: May 26, 2010

(65) Prior Publication Data

US 2010/0303543 A1 Dec. 2, 2010

Related U.S. Application Data

(60) Provisional application No. 61/217,141, filed on May 27, 2009, provisional application No. 61/217,673, filed on Jun. 3, 2009, provisional application No. 61/217,142, filed on May 27, 2009.

(51) Int. Cl.
*F16B 2/14* (2006.01)

(52) U.S. Cl.
USPC ......... 403/374.3; 403/400; 403/396; 403/385

(58) Field of Classification Search
USPC ........... 403/373, 374.1–374.4, 385, 396, 400, 403/409.1; 248/228.2, 229.11, 229.21, 248/231.31, 316.2
See application file for complete search history.

(56) References Cited

U.S. PATENT DOCUMENTS

| | | | | |
|---|---|---|---|---|
| 1,716,904 A | * | 6/1929 | Siderits | 403/396 |
| 3,129,915 A | | 4/1964 | Budnick | |
| 3,279,829 A | * | 10/1966 | Kurtenacker et al. | 403/396 |
| 3,298,646 A | | 1/1967 | van Buren, Jr. | |
| 3,633,949 A | * | 1/1972 | Pfluger | 403/343 |
| 3,854,552 A | * | 12/1974 | Kensrue | 182/222 |
| 4,019,705 A | | 4/1977 | Habuda, Sr. | |
| 4,592,186 A | * | 6/1986 | Braginetz | 52/699 |
| 5,174,680 A | * | 12/1992 | Nakamura et al. | 403/370 |
| 5,639,176 A | * | 6/1997 | Mullenberg | 403/282 |
| 5,647,685 A | * | 7/1997 | Fukui et al. | 403/370 |
| 5,673,938 A | * | 10/1997 | Kaliszewski | 280/777 |
| 5,785,461 A | * | 7/1998 | Lambert | 403/167 |
| 6,893,185 B1 | * | 5/2005 | Wood | 403/374.4 |
| 7,156,575 B2 | * | 1/2007 | Weiss et al. | 403/1 |
| 7,309,187 B2 | * | 12/2007 | Swanson | 403/373 |
| 7,431,252 B2 | | 10/2008 | Birli | |

FOREIGN PATENT DOCUMENTS

GB 2232217 A * 12/1990 ............... F16B 2/14

OTHER PUBLICATIONS

Alibaba.com; Examples of Common Building Strut Hangers and Clamps. Multiple sources. Sheets. Copyright 2012.

* cited by examiner

*Primary Examiner* — Michael P Ferguson
*Assistant Examiner* — Jonathan Masinick
(74) *Attorney, Agent, or Firm* — Smith Moore Leatherwood LLP; Philip P. McCann; John P. Zimmer

(57) ABSTRACT

A wedge clamp providing for a positive attachment to structural angles, I-beams, H-beams, T-bars, plates, boards, conventional angles, bulb angles, channels, plates and other similar structural shapes comprises a clamp wedge and body that capture objects with two opposing surfaces securing the objects against each other using a fastener or other means to engage both parts of the clamp to pull the wedge through the body and causing the objects being attached together to be squeezed together. The wedge clamp is also used to support other members using a bolt or threaded rod attached to the wedge clamp which in this case normally attaches to a single flange of the structure.

7 Claims, 10 Drawing Sheets

Figure 5:
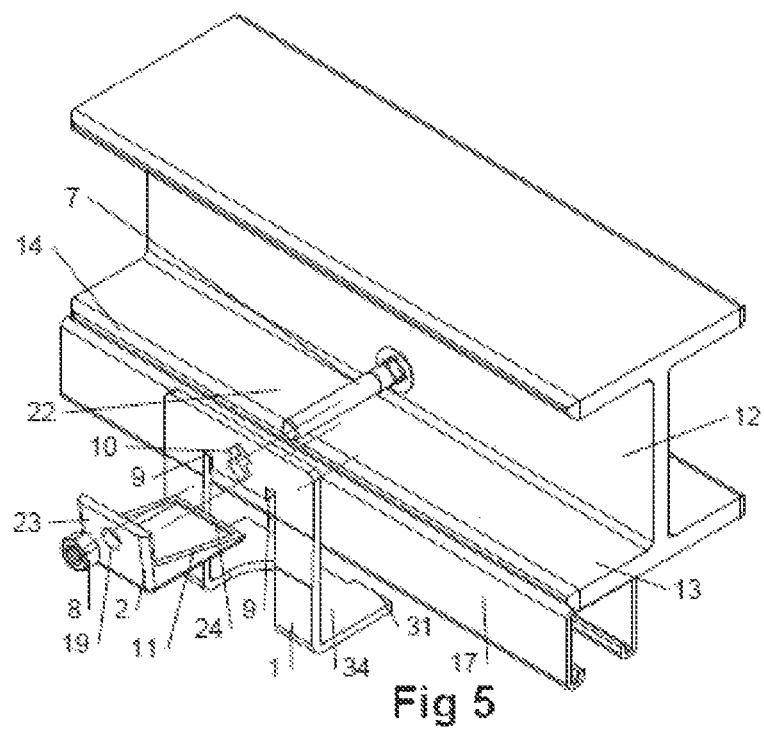

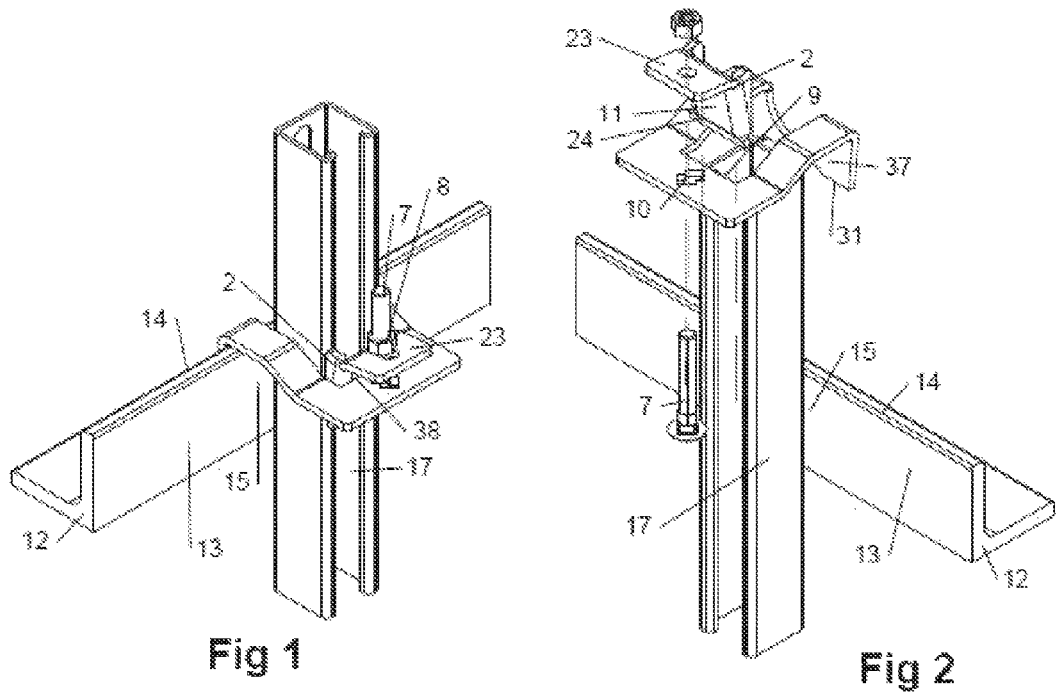
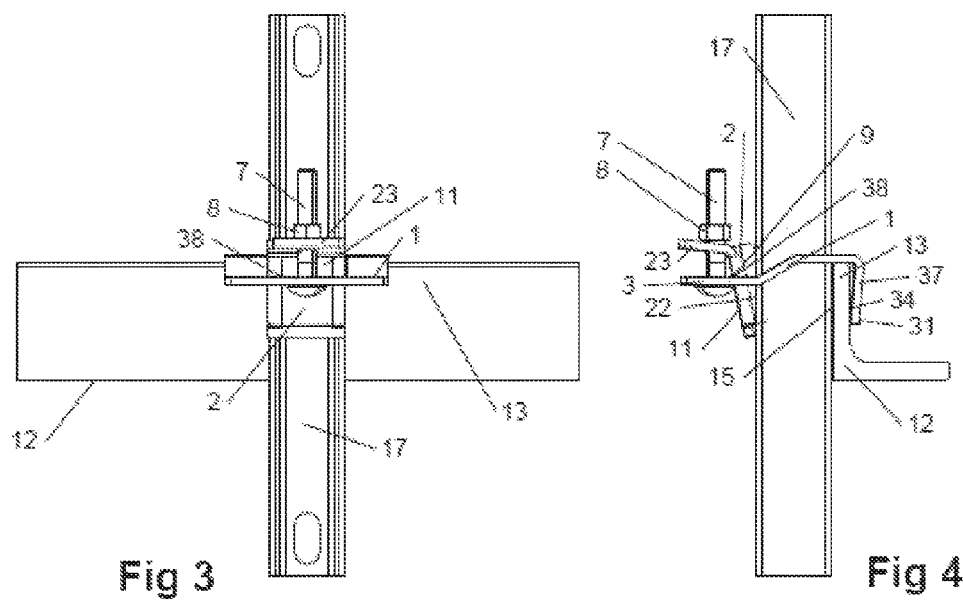

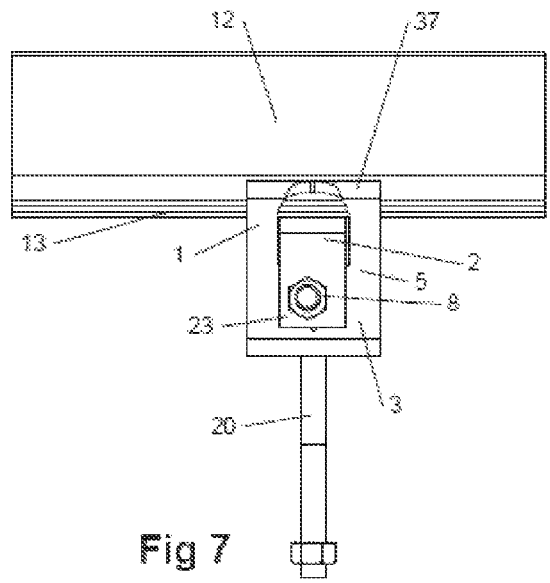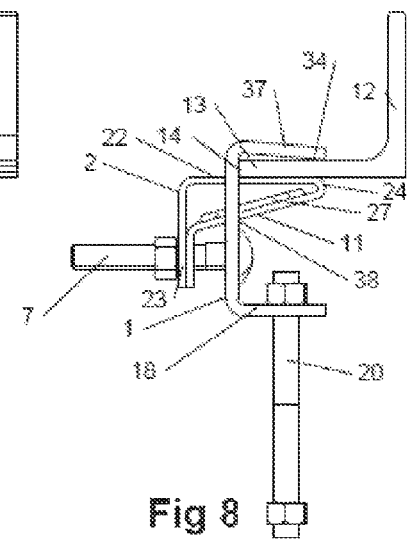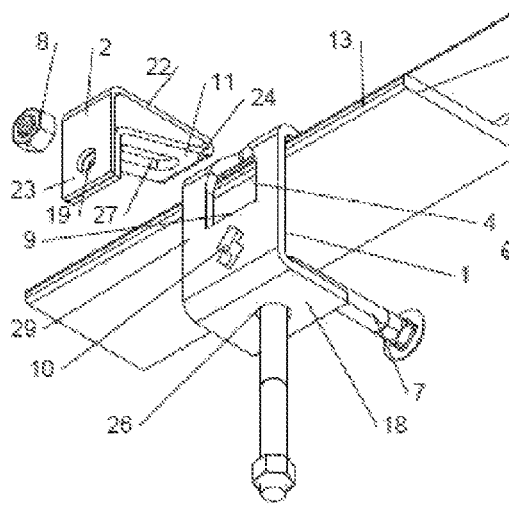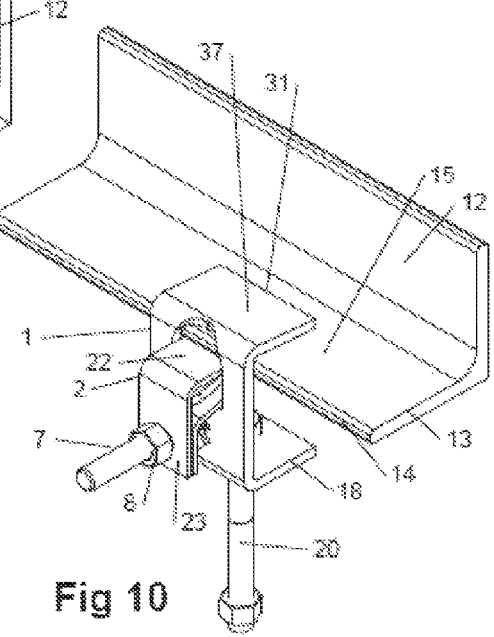

WEDGE CLAMP

CROSS-REFERENCE TO RELATED APPLICATIONS

Provisional patent application 61/217,141 filed on May 27, 2009 and provisional patent applications 61/217,673 filed on Jun. 3, 2009 and 61/217,142 with a filing date of May 27, 2009 and being submitted as a non provisional patent application along with this application.

FEDERALLY SPONSORED RESEARCH

Not Applicable

SEQUENCE LISTING OR PROGRAM

Not applicable

BACKGROUND

1. Field

This application relates to the attaching of structural and accessory members to each other. Specifically for attaching a member to beams, structural angles, or other structural configurations that have a flange.

2. Prior Art

Clamps are often used to attach or hang a variety of hardware items from structural members such as I-beams, T-bars, steel trusses and other structural shapes inside building and structures.

Often strut channels attached to I-beams and other structures with a flange are used to support a number of different items such as pipes, lighting fixtures, heating fixtures, cables, conduit, duct and struts. The items are then attached to the strut channels using an appropriate means of clamping or attaching. Clamps are often used as hangers for supporting and attaching a variety of items such as pipes, electrical devices, lighting equipment, heating fixtures, cables, conduit, duct, channel struts, for example, from a variety of structural members such as I-beams, T-bars, steel trusses and other structural shapes that include two juxtaposed edges. This system of attachment of common hardware and methods used for supporting hardware within building structures are based on strut channels that were developed in the 1920's with only small advancements. The basic strut channel has not changed.

The strut channels are attached to structures at a right angle to the edge of the flange of the structure member or in line with the direction, which the structure runs. Struts are normally attached to beams using two sets of u-bolts, one set on each side of the I-beam flange with a bent plate with two holes that the threaded ends of a u-bolt pass positioned on the opposite side of the beam flange that contain the strut channel to the outer side of the flange of the beam. Struts are also attached using a bent plate that has a rectangular opening for the strut to pass through on an outside surface of the beam with a bent portion with a threaded hole for a bolt to be tightened against the inside portion of the beam flange to pull the strut against the I-beam. This type of clamp has a greater tendency to twist, pivoting about the bolt that carries the load. Both of these methods for attaching the struts to the I-beam depend entirely on the strength of the threaded fasteners to provide both the clamping force and bear the weight of the load.

One version of my invention uses one bolt to pull a wedge into a passage in the body of the clamp body and has a member passage that allows members including, struts and pipes, to pass. A second version clamps two flat objects together. A third version provides for a hanger rod or bolt to support loads. The fourth utility is a means for quickly hanging hardware using standard hanger strapping. Most of the forces for holding the member in place against the outer flange are accomplished by the clamp instead of by the bolt that pulls the wedge into the body. The wedge is also used to integrate the clamping function into other metal boxes or cabinets such as the enclosures for many fan or light fixtures.

My invention provides advantages during installation where the hardware is much easier to install than any existing method. C-clamp style of clamps are tightened from the side of the flange opposite the load being held. This often limits access to the head of the bolt, which is often in a hard to access location between flanges of a beam or on top portion of the structure. Tightening the wedge clamp is done from the side making it easier to access from a lower height.

Another advantage of my invention is that since the load is not supported directly on the end of a bolt there is no tendency for the clamp to loosen over time as c-clamp style clamp may. The bolt on a c-clamp can over time twist and loosen and can penetrate the flange where the forces are all concentrated through the end of the bolt. The bolt on the wedge clamp on the other hand does not directly support the load, instead it holds a wedge in the body of the clamp in a way that there are no forces on the bolt over time that cause it to twist thus loosening.

My invention allows for a number of functions to be accomplished not currently feasible. Strut channels, pipes, conduits, boards and other members can be attached in line or at a non perpendicular angle in relation to the structures being joined, particularly in the center of the outside of an I-beam flange without drilling holes or welding. This is accomplished by using a cross bar or adapter channel that uses the same clamp described above to securely hold members to the I-beam or other structure that has a flange. Different shapes of members can be attached using an accessory in conjunction with the clamp apparatus. These accessories include; cross member, adapter, shield, insulation and protective padding materials. The accessories can allow attachment of sensitive materials in either direction and to allow for movement such as is caused by expansion and contraction resulting from changes in temperature.

Another advantage of this invention is that it allows supported members to attach to a wide range of sizes and shapes of I-beams and other configurations for each size of clamp. Within a range of widths and thicknesses of a beam or other configurations, the same size clamp can be used The wedge clamp can be used as an alternative to c-clamps to secure objects together when a wide range of adjustment is not needed such as making many attachments each within a half inch of the same overall thickness of objects being clamped together.

Spacers can be used with the wedge clamp assembly to fill up the space within the clamping area to use a particular size combination of wedge and body to clamp a thinner cross-section of material.

Manufacturing of this style of clamp when made from steel plate is easier to tool up than a c-clamp style of clamp since there is no threading required in the manufacturing process.

The configuration of the above described wedge has a major advantage over typical wedges. A single wedge by itself has no means to stabilize if the load is not applied directly between surfaces being acted on while my invention has a tab extending past the sloping surface that allows the fastener forcing the wedge through the opening to also force the tip of the wedge toward the object being clamped even if the forces are not in line. This is accomplished by creating a lever action pivoting the wedge about the point of contact between the sloped portion of the wedge and the clamp body or other body that it passes.

The wedge used in the wedge clamp is an innovation by itself. Typically wedges are forced between contact surfaces causing the surfaces to separate. This works well if there is a balanced load or surface area on each side but if there is one contact line opposing a surface and the contact line is not directly across from the flat surface then the wedge will usually twist and not make good contact on the flat surface. My wedge has an offset tab with a hole for a fastener that creates both a wedge action and a lever action. When the fastener pulls the wedge into the area between the contact line and the flat surface a pivoting of the wedge at the point where the sloping surface of the wedge and the contact line is created thus keeping the tip of the wedge and the flat surface in full contact. One benefit of this is it allows the wedge to be used in boxes with opening for the wedge to pass, such as that of a heater or fan installed into a wall through cut opening to be used to secure the box by a flange being held against the face of the flat surface and a wedge being inserted from inside the box to a opening directly behind the flat surface. There is a lot of flexibility in where the wedges can be used.

SUMMARY

A clamp assembly that has a wedge and body pulled together using one or more means for pulling the member gripping end of the clamp bodies toward each other and down against the member. The preferred method for pulling the clamp wedge and body toward each other is the use of a bolt and nut. Accessory items can be used to adapt to and secure in different ways the member(s). Further utility is accomplished by the use of crossbars, channels, adapters, to span between each opposing clamp body to transfer a clamping force from the clamp bodies to fasten round, rectangle and other shaped members to the structural member. Flanges or ribs can be used to strengthen the clamps. Alternately, not shown, multiple passages in the body along with multiple wedges can be used to secure larger objects or passage hole employed directly in objects supported or clamped. When clamping larger objects the addition of flanges or ribs can be used to strengthen the clamp wedge and body.

When the position of the members clamped is to be at a lower level than the supporting member then configurations including a flange with a hole for a hanger bolt or threaded rod are used, allowing members to support subsequent members at a lower lever or different direction.

DRAWINGS

Figures

FIG. 1 Side view of a strut channel attached to an angle using a wedge clamp that allows the strut channel to pass through the body portion of the assembly as seen from in line with the direction the angle runs.

FIG. 2 Plan view of a strut channel attached to an angle using a wedge clamp that allows the strut channel to pass through the body portion of the assembly as seen from perpendicular to the direction that both the angle and the strut channel runs.

FIG. 3 Partially exploded Isometric view of assembly shown in FIGS. 1 and 2 as seen from the mounting surface side of strut channel attached to the angle.

FIG. 4 Isometric view of assembly shown in FIGS. 1 and 2 as seen from the mounting surface side of strut channel attached to the angle.

FIG. 5 Partially exploded Isometric view of a strut channel attached to a flange of an I-beam using a wedge clamp that wraps partway around the strut channel as seen from the I-beam side of the assembly.

Figure 6:
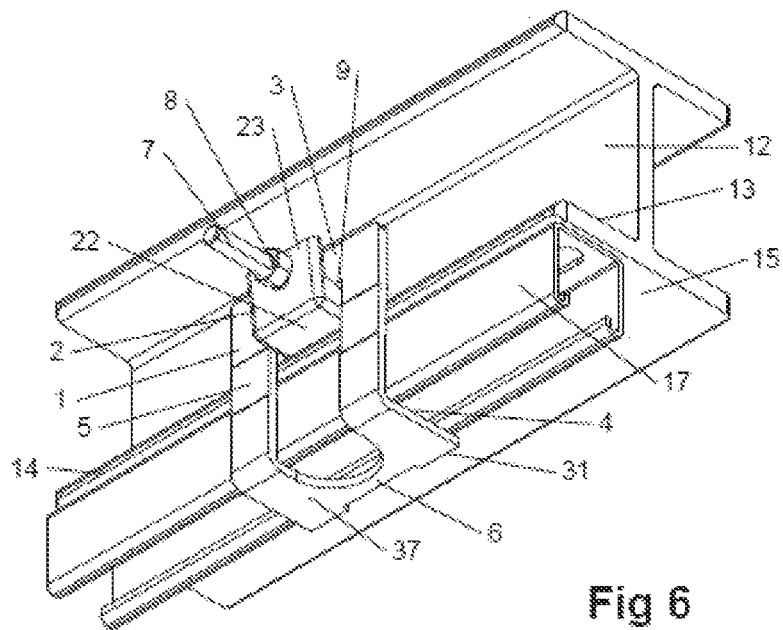

FIG. 6 Isometric view of a strut channel attached to a flange of an I-beam using a wedge clamp that wraps partway around the strut channel as seen from the strut channel side of the assembly.

FIG. 7 Side view of a wedge clamp assembly configured for attaching a load to a flange using a threaded rod.

FIG. 8 End view of a wedge clamp assembly configured for attaching a load to a flange using a threaded rod.

FIG. 9 Partially exploded Isometric view of a wedge clamp assembly configured for attaching a load to a flange using a threaded rod as seen from the threaded rod side of the flange.

FIG. 10 Isometric view of a wedge clamp assembly configured for attaching a load to a flange using a threaded rod as seen from the top side of the flange.

Figure 11:
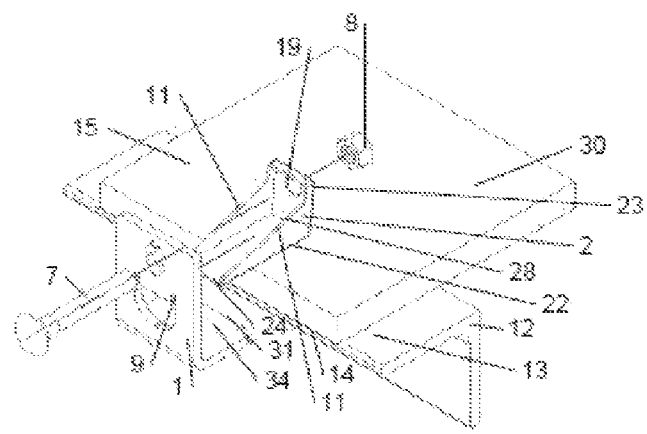

FIG. 11 Partially exploded isometric view showing a wedge clamp used to clamp a plate to and the flange of a structural angle.

Figure 12:
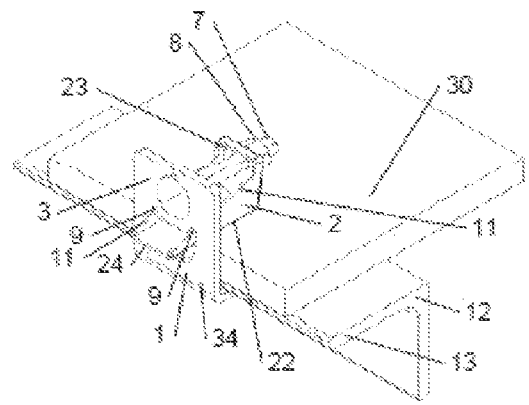

FIG. 12 Isometric view showing a wedge clamp used to clamp a plate to and the flange of a structural angle viewed from the wedge side.

Figure 13:
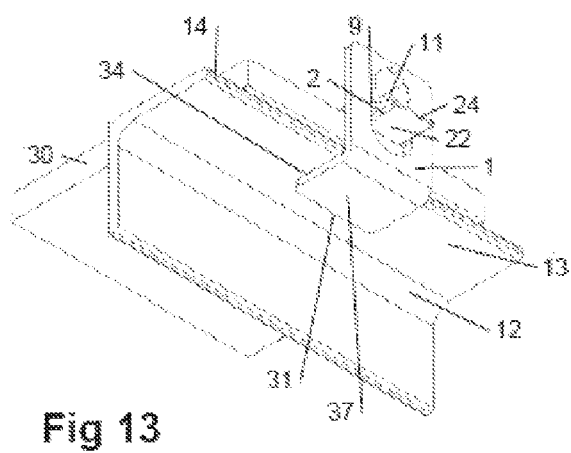

FIG. 13 Isometric view showing a wedge clamp used to clamp a plate to and the flange of a structural angle viewed from the structure angle side.

Figure 14:
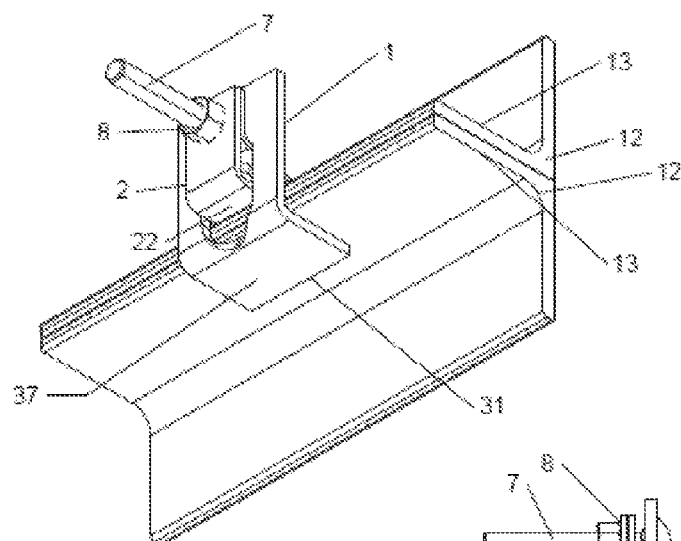

FIG. 14 Partially exploded isometric view showing a wedge clamp used to clamp the flanges of two structural angles together.

Figure 15:
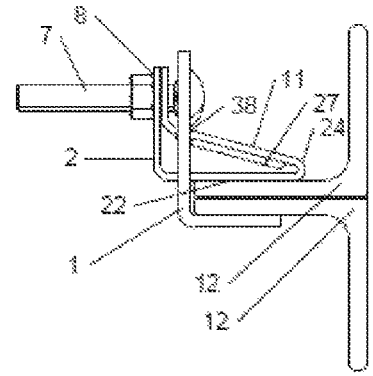

FIG. 15 End view showing a wedge clamp used to clamp the flanges of two structural angles together.

Figure 16:
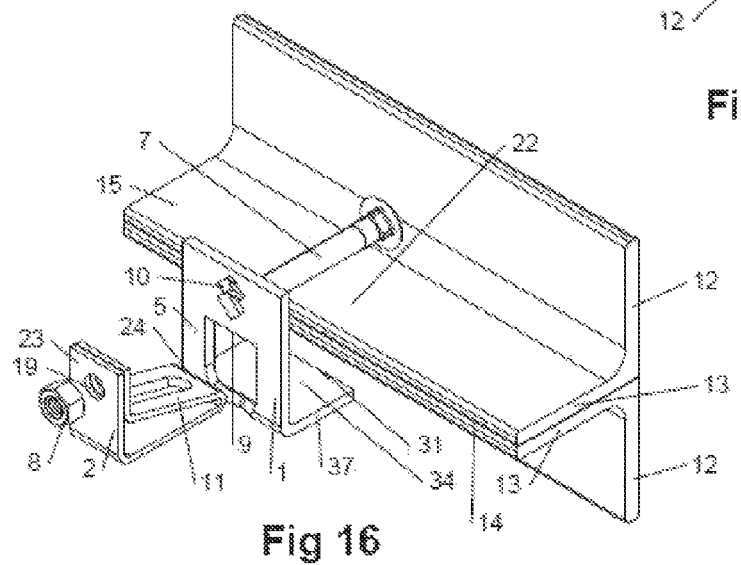

FIG. 16 Partially exploded isometric view showing a wedge clamp used to hold two structural angles together viewed from the wedge side.

Figure 17:
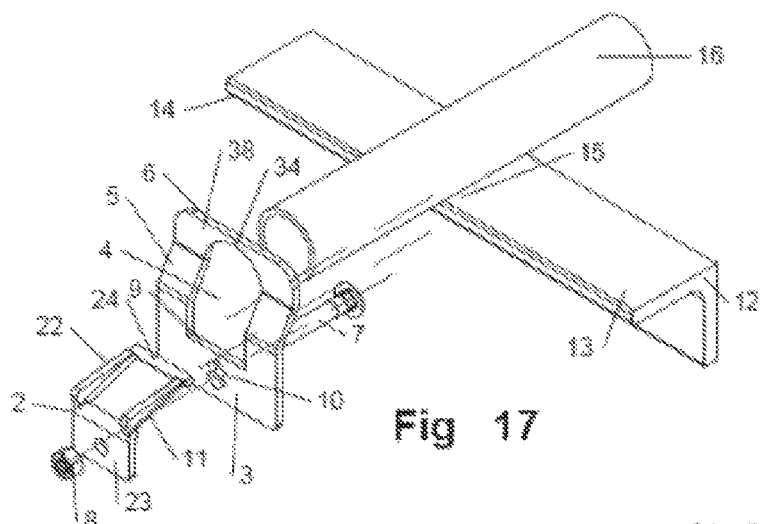

FIG. 17 Exploded isometric view of a wedge clamp configuration used to attach a pipe or conduit to the flange of a structural angle seen from the pipe side of the attachment.

Figure 18:
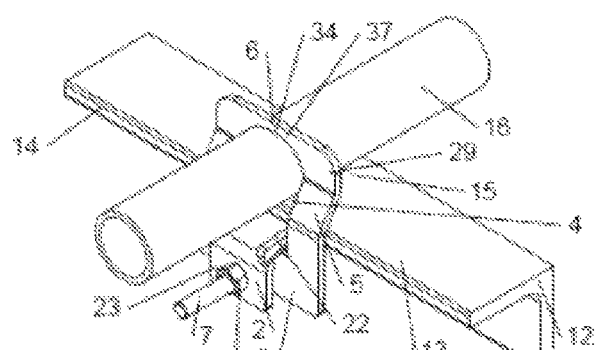

FIG. 18 Isometric view of a wedge clamp configuration used to attach a pipe or conduit to the flange of a structural angle seen from the pipe side of the attachment.

Figure 19:
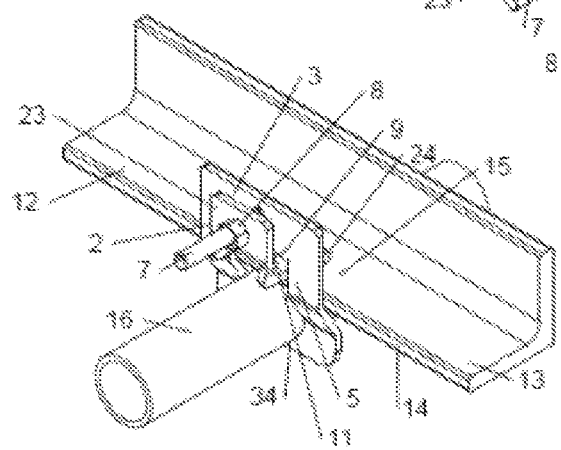

FIG. 19 Isometric view of a wedge clamp configuration used to attach a pipe or conduit to the flange of a structural angle seen from the wedge side of the attachment.

Figure 20:
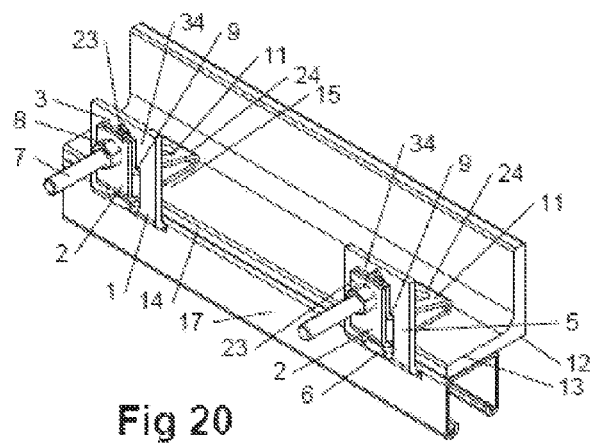

FIG. 20 Isometric view of a strut channel attached in line on a flange of a structural angle that features the strut channel with rectangular holes that allow the flange of the clamp beam to enter the side of the strut channel at the base thus allowing it to be clamped to the flange.

Figure 21:
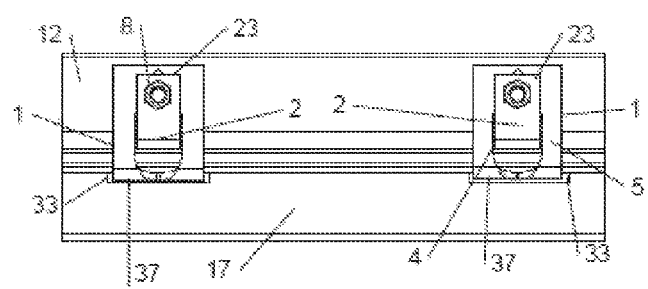

FIG. 21 Side view of a strut channel attached in line on a flange of a structural angle that features the strut channel with rectangular holes that allow the flange of the clamp beam to enter the side of the strut channel at the base thus allowing it to be clamped to the flange.

Figure 22:
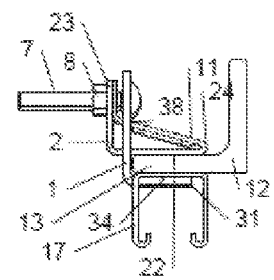

FIG. 22 End view of a strut channel attached in line on a flange of a structural angle that features the strut channel with rectangular holes that allow the flange of the clamp beam to enter the side of the strut channel at the base thus allowing it to be clamped to the flange.

Figure 23:
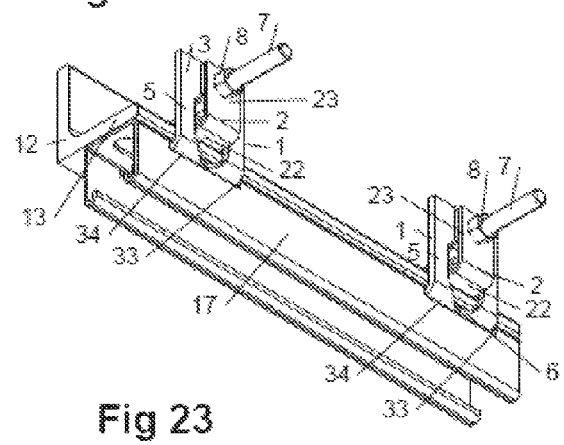

FIG. 23 Isometric view of a strut channel attached in line on a flange of a structural angle that features the strut channel with rectangular holes that allow the flange of the clamp beam to enter the side of the strut channel at the base thus allowing it clamped to the flange.

Figure 24:
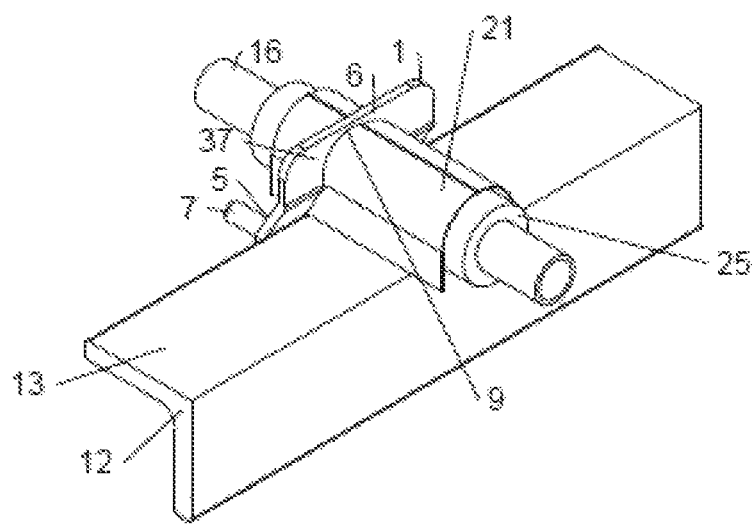

FIG. 24 Isometric view of a protected round tube mounted perpendicular to and on the flange of a structural angle. It shows the tube surrounded by tubular shaped soft material, covered with a u-shape shield protecting and containing said material and allowing the clamp to grip the items.

Figure 25:
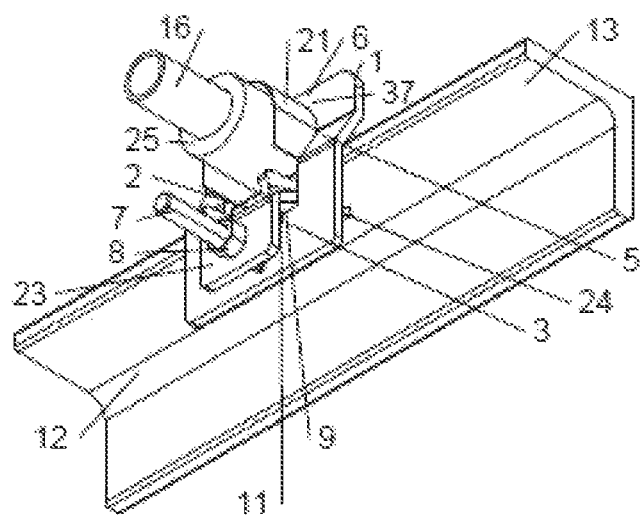

FIG. 25 Isometric view of a protected round tube mounted perpendicular to and on the flange of a structural angle. It shows the tube surrounded by tubular shaped soft material, which covered with a u-shape shield protecting and containing the material and allowing the clamp to grip the tube, the soft material, and the shield.

Figure 26:
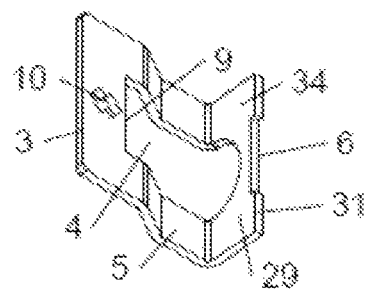

FIG. 26 Illustration of the various clamp bodies previously included in the above figs.

Figure 27:
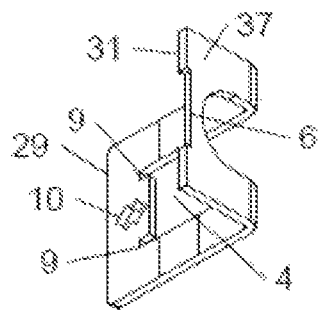

FIG. 27 Illustration of the various clamp bodies previously shown in FIG. 26 and included in other clamp assemblies in the proceeding figs.

Figure 28:
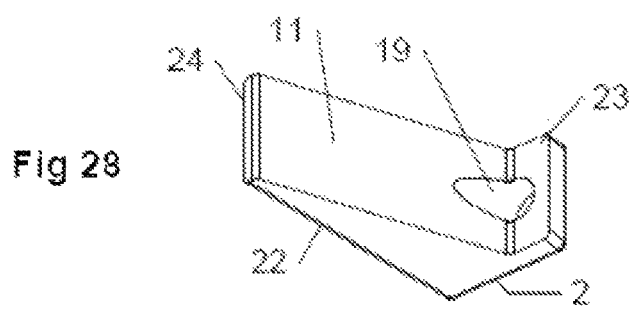

FIG. 28 Illustration of the various clamp wedges previously included in the above wedge clamp assemblies displayed in the above figs.

Figure 29:
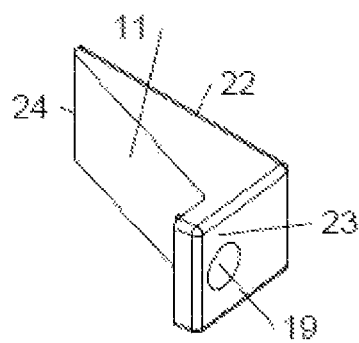

FIG. 29 Illustration of the various clamp wedges previously shown in FIG. 28 and included in the clamp assemblies previously displayed in the above figs.

Figure 30:
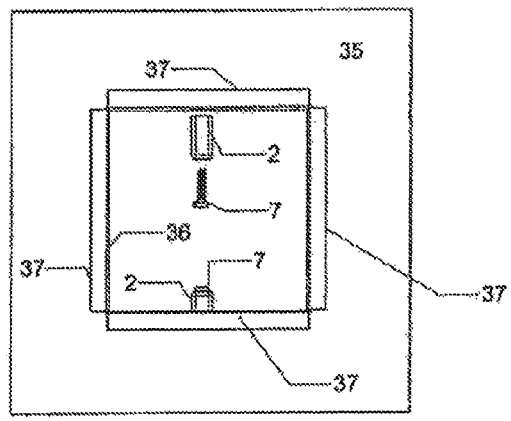

FIG. 30 Top plan view of enclosure inserted into a opening in a ridged flat surface. One wedge is inserted and one is shown outside passage.

Figure 31:
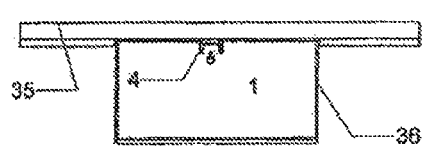

FIG. 31 End view of enclosure inserted into a opening in a ridged flat surface.

Figure 32:
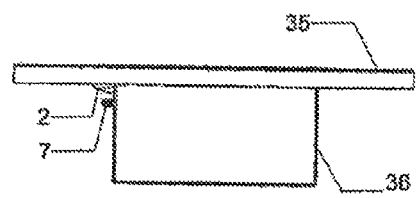

FIG. 32 Side view of enclosure inserted into a opening in a ridged flat surface.

Figure 33:
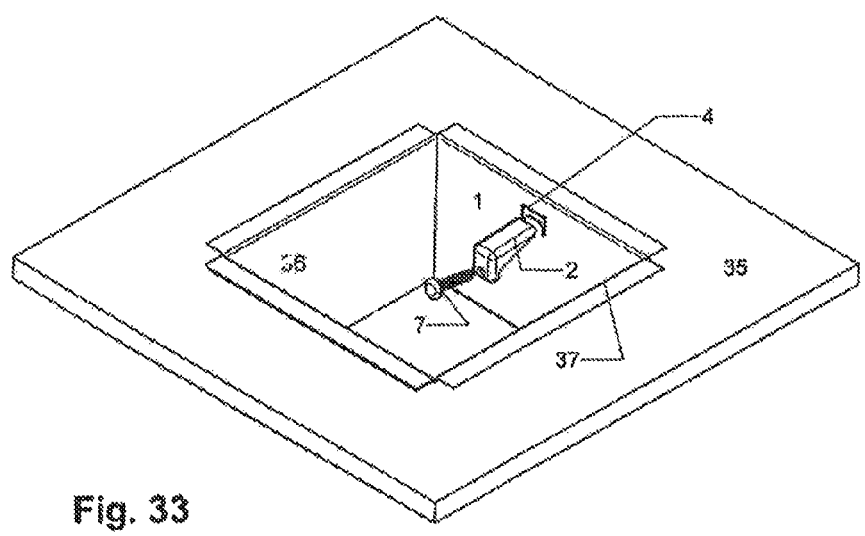

FIG. 33 Isometric view of enclosure inserted into an opening in a ridged flat surface. One wedge is shown before being inserted outside the passage.

DRAWINGS

Reference Numerals

1 Body
2 Wedge
3 Bolt end
4 Member passage
5 Side connector
6 Connector web
7 Bolt
8 Nut
9 Gripping edge
10 Alignment holes
11 Sloping contact
12 Structure member
13 Structure flange
14 Structure edge
15 Structure bearing surface
16 Round member
17 Rectangular member
18 Hanger flange
19 Wedge hole
20 Hanger rod
21 Curved Shield
22 Slide surface
23 Pull tab
24 Wedge tip
25 Tubular padding
26 Hanger hole
27 Rib
28 Flange
29 Clamp end
30 Plate
31 Clamp edge
32 Adapter
33 Cutout
34 Containment end
35 Ridged flat Surface
36 Enclosure
37 Containing Portion

DETAILED DESCRIPTION

Wedge Clamp assembly comprised of a body 1, and a wedge 2 a bolt 7 and nut 8 or other fastener capable of pulling the wedge 2 through a member passage 4 located in the central portion of the body 1. As the bolt and nut are engaged the wedge is pulled through the member passage 4 in the body a, sloping surface 11 slides against a gripping edge 9 and against either a rectangular member 17, that also passes through the same member passage, in the clamp body 1, or against the structure flange 13 or other flat element being clamped. The wedge and clamp body interact in a planar area that is within the member passage 4 portion of the body. The increasing width between the sloping surface 11 and a slide surface 22 and corresponding reduction in the distance between the sliding surface 22 and a containing edge 34 resulting from the movement of the wedge in relation to the body, the opening size between the slide surface 11 and the containing edge 34 of the clamp body decreases. The decreasing distance causes a clamping action to occur between the sliding surface 22 and containing edge 34. Not shown, the gripping edge 9 made with a smooth radius edge or a bent portion that matches the slope of the wedge to make the engagement of the body and wedge smooth.

As the fastener pulls against a pull tab 23 on the wedge, two forces combine to create the clamping force. The first is the wedge action described above. The second force is a lever force where the pull-tab 23 creates a pivoting force about the gripping edge 9 that holds the wedge tip 24 against the objects clamped together. This force allows the wedge to slide through the member passage without losing contact between the slide surface 22, and the gripping edge and between the sliding surface 22 and the objects clamped together and between the objects clamped and the containment end 34 of the body. The pull-tab further increasingly causes clamping forces to result from the pivoting of the wedge about the gripping edge as the pull-tab 23 pulled towards the body. The forces automatically balance, accomplishing the clamping. The wedge can be inserted into the member passage of the clamp body from either direction.

The wedge 2 can be made from any sufficiently strong, ridged material, and in many different configurations illustrated in, but not limited to, the collection of different wedges shown in FIGS. 28 and 29. The elements that may be part of the wedge include the pull-tab 23 that has a wedge hole 19 that enables the wedge being pulled, using a fastener system including a bolt 7 and a nut 8. A slide surface 22 is either one surface that generally spans the width and length of the wedge 2 or two surfaces that are on the same plane that are on opposite sides of the wedge 2 and runs the length of the wedge 2. A sloping contact 11 is either one surface that generally spans the width and length of the wedge 2 or two surfaces that are on the same plane that are on opposite sides of the wedge 2 and runs the length of the wedge 2 on a plane that intersects with and is at an angle the slide surface 22 with vertex between the slide surface 22 and the sloping contact 11 being at the wedge tip 22. The angle created between the slide surface and the sloping contact creates a wedge that is the essence of what makes this clamp. The wedge embodiment thus has to include the sliding surface, the sloping surface and means to pull the wedge into the clamp body. Other embodiments may include a rib 27 or flanges to increase the strength and rigidity of the wedge.

The body 1 can be made from any sufficiently strong, ridged material, and in different configurations illustrated in, but not limited to, the collection of different bodies shown in FIGS. 26 and 27. The elements that may be part of the body include a member passage 4 that allows a wedge and optionally a combination of members or other objects to pass. A bolt end 3 has alignment holes 10 configured to have positions that allow a bolt to be maintained in a position close to perpendicular to the body 1 and to the wedge pull tab 23. As the wedge moves through the opening in the body, the distance of hole in wedge relative to each alignment hole changes as a direct result of the slope of the wedge. Multiple positions enables the position furthest from the gripping edge on the hole end of the body to be used as the wedge tip 24 is inserted into the member passage and positions closer to the gripping edge 9 to be used for a greater thickness of objects clamped. As the thicker portion of the wedge moves toward the gripping edge 9 the area, the thickness of the object clamped decreases. The member passage 4 is defined by an area enclosed by the bolt end 3, two side connectors 5 and by clamp edge end. Optionally a connector web 6 may connect the two side connectors 5, on the end furthest from the bolt end 3, thus closing the member passage 4. If there is a connector web, it can be used to directly engage and clamp a round member 16 or a rectangular member 17. The containing end 34 may extend and bend to capture objects and to grip a structural flange 13 or other object. The bend profile and length of the flange created allow the configurations to significantly match the profile of the objects clamped. The containment end 34 is profiled to provide a clamp edge 31 that securely holds the assembly in place on the structure flange 13 of the assembly attached. A hanger flange 18 incorporated on the end of the bolt end of body to provide a means for attaching a hanger rod 20 or bolt that supports and holds other items. This hanger flange is at an angle usually near perpendicular to the bolt end of the body and has a hole for a fastener to pass. The body is formed in a way that positions the gripping edge 9 substantially in line with the edge of the containment end 34 that creates a more planar interaction of the embodiments generally in line with the bolt end surface thus creating a more stable clamping. The gripping edge 9 is either a continuous edge running the length of the bolt end 3 of the member passage or is created by separate edges in line with each other and on opposite sides of the member passage 4.

Referring to FIGS. 1, 2, 3 and 4, the use of a this wedge clamp configuration provides a method of attaching a strut channel or other rectangular member 16 perpendicular to the member direction and on the face of an angle or other structures that include a flange 28. In this case, the bolt end 3 is offset to provide in line clamping between the gripping edge 9 and the clamp edge 31 that grips the structure flange 13.

Referring to FIGS. 5, and 6, the use of this wedge clamp configuration provides a method of attaching a strut channel or other rectangular member 16 in line to the beam direction on the face of the beam or other structures that include a flange 28. In this case, the bolt end and side connectors 5 are straight in the same plane and includes a flange on the containing end 34 sufficient to capture and provide a support for creating in line clamping between the structure flange 13 and the containing end 34 that grips the structure flange 13.

Referring to FIGS. 7, 8, 9 and 10, the use of a this wedge clamp configuration provides a method of attaching a hanger rod 20, a fastener, or a bolt 7, used to support other items attached the other end, to be attached to a structure flange 13 such as the flange of a structural angle shown. This shows the bolt end 3, with a hanger flange 18 added to provide a surface with a hanger hole 26 to provide a means of attachment.

Referring to FIGS. 11, 12, and 13, the use of a this wedge clamp configuration provides a method of attaching a flat object such as a board, a plate 30, or a second flanged member to the flange of the first structure. Any two objects that contain a flat surface can be secured together with this method and use of wedge clamp. This illustration shows the wedge pulled into the body in the opposite direction shown in prior figs.

Referring to FIGS. 14, 15, and 16, the use of a wedge clamp configuration provides a method of attaching a structural angle to another structural angle.

Referring to FIGS. 1, 2, 3 and 4, the use of a this wedge clamp configuration provides a method of attaching a round member 16 such as a pipe or conduit perpendicular to the member's direction and on the face of an angle or other structures that include a flange. In this case, the containment 34 end is offset to provide an in line clamping between the containment end 34 and contact area of the wedge slide surface 22. This increases the stability by focusing the clamping forces in a direction through the flange rather than in line with structure edge 14.

Referring to FIGS. 20, 21, 22, and 23, a strut channel that has cutout 33 holes included in the side and next to the base that allow the clamp end 29 to penetrate and engage the inside surface of the base of the strut channel clamping the channel to a structure flange 13. Multiple cutouts and a corresponding number of clamps can be used to provide secure attachment along any length of strut channel attached. This same method of clamping can be used to attach other objects that have a cutout 33 included in the body of the object being attached. This includes but is not limited to objects such as lighting fixtures, electrical enclosures, ducts, and equipment enclosures.

Referring to FIGS. 24 and 25, a pipe held inside an insulating sleeve shields and contains the pipe with a curved shield 21 as a means to attach a pipe or tube to a structure flange. This provides a means for adapting to a different size member than a wedge clamp with a member passage 4. It further provides protection to the round member 16 allowing the member to slide through the opening as needed to allow for expansion and contraction due to changing temperatures in the round member. It also protects the member from damage from the wedge clamp. Using the same method of shielding other shapes and sizes of both round members and rectangular members held and protected. Other shapes and sizes of shields used to adapt to a corresponding shape and size of member and clamp.

Wedge Clamp can be used for attaching and holding multiple objects that include plates, strut channels, pipes, conduits, boards, structural angles, I-beams, purling, and other shapes. The clamp is made up of a wedge 2 and a body 1 using a fastener or other method to pull the wedge into the opening in the center portion of the clamp body 1. Each body is comprised of at least three elements, a bolt end 3, two side connectors 5, a griping end 9, and a member passage 4. Beginning on one end referred to as the bolt end 3, a section for engaging a fastener such as a bolt 7 which may include alignment holes 10 for locating the fastener at different levels thus allowing different positions to account for a range of thicknesses of materials to be clamped together. Connected to the bolt end 3 on both sides are side connectors 5 that transverse between the bolt end 3 and the containment end 34. The member passage 4 is the open area between the two side connectors 5. The member passage 4 captures a separate element, a wedge 2, on the sides and interior to the side connectors 5. A gripping edge 9 is inside the member passage 4 and made up of at least a portion of the bolt end 3 edge, which is interior to the member passage 4 between the side connectors 5. The containment end 34 in one case has a connector web 6 that connects between the two opposing side connectors 5 creating an element capable of gripping an elongated element that passes through the member passage 4 or capturing an elongated object that runs in line with one of the objects that clamped together. In the second case, the containment end can have a portion at an angle between 50 degrees and 150 degrees to the bolt end. In this case, the containing end captures the objects clamped together on the side opposite from the bolt end making contact along the clamp edge 31. The connector web 6 is optional thus allowing either the body 1 to surround an element clamped or the member passage 4 to be open on the clamp end, allowing the body to be placed over the objects without the need to slip them over the end of the objects clamped.

A wedge 2 is the second element used to make a wedge clamp. The wedge 2 is configured to pass through the member passage 4 in the body 1, together providing a means for changing the distance from the sliding surface of the wedge 2 and the containment end 34 of the body 1. The wedge 2 has a sloping surface that interacts with the gripping edge 9 in the body's member passage 4. The wedge 2 further has a slide surface 22 that contacts an object clamped. The third element of the wedge is the pull-tab 23 that connects to both the sloping contact 11 and the slide surface 22, jointly pulling them into the member passage 4 using the body 1 as an anchor.

A method of holding a box or enclosure 36 into an opening in a ridged flat surface 35 sized to allow the enclosure to attach to the ridged flat surface 35 with a flange (retaining portion 37) held against the ridged flat surface on one side and one or more wedges squeezing against the opposite side. The body 1 portion of the enclosure has a flange or containing portion 37 that is constrained against one side of the ridged flat surface 35 that is oriented at about 90 degrees to a body 1 portion, extending a sufficient distance past the ridged flat surface 35 to allow a member passage 4 in the of a size and shape that allows a wedge 2 to be inserted in the body of the enclosure 36 causing the distance between the flat slide surface 22 of the wedge 2 and the containing portion 37 to decrease and clamp the ridged flat surface 35.

Other elements not shown are bars, channel, and spacer used in conjunction with the wedge clamp for holding strut channel, pipes, conduit and other members in line with the beam. Wedge clamps used in combination with other elements already discussed can be used to support other structures at a lower level either in line or at a right angle to the beam.

Advantages

My invention provides improvements in ways objects can be attached to each other and provides methods for attaching not currently feasible. Strut channels, pipes, conduits, boards and other members and objects can be attached across the face or in-line with a flange without drilling holes or welding. There are also different shapes that can be attached by using an appropriate cross member adapter. Shields and protective padding or insulating materials can be included to allow attachment of sensitive materials in either direction and to allow for movement such caused by expansion and contraction resulting from changes in temperature.

Another advantage of this invention is that it allows supported members to attach to a wide range of sizes and shapes of structures, surfaces and other configurations for each size of clamp. Within a range of widths and thicknesses of a flange or other configurations, the wedge clamp provides the squeezing action within the clamping assembly.

CONCLUSION, RAMIFICATION, AND SCOPE

This wedge clamp allows attachment of channel struts, plates, boards, pipes, conduit, and equipment to the interior of buildings in ways not currently done due to a lack of an efficient and strong way for attachment to structures such as purlines, angles, I-Beams and truss structures. A number of new methods for attaching or mounting hardware are made possible by this invention using the clamp bodies along with appropriate accessories comprising such adapters.

This wedge clamp when used to connect a series of I-beams or trusses that are arranged generally parallel to each other using either round or rectangular members provides stiffening and bracing to the overall structure made up of the I-beams and trusses.

This wedge clamp can be used as a permanent fastener or as a fastener that can be used to quickly assemble or disassemble simple and complex structures that are temporary and can be assembled in different ways.

The invention claimed is:

1. A wedge clamp for clamping a clamped member to a rectangular structural article, said wedge clamp comprises:
   a) a wedge comprising:
   a1) a first flat plane surface of the wedge which contacts said clamped member along a plane created at a contacting area between said first flat plane surface and said clamped member;
   a2) a sloping flat plane surface of the wedge positioned on an opposite side of the wedge to the first flat plane surface;
   a3) a tip end formed by the intersection of the first flat plane surface and the sloping flat plane surface wherein said tip end has a tip length; and
   a4) a pull tab having a second flat plane surface located opposite to the tip end and connected to the first flat plane surface of the wedge, wherein the pull tab extends at an angle of from about 85 to about 120 degrees as measured from the first flat plane surface and extending from the sloping flat plane surface at the pull tab and wherein the tip end extends in a plane parallel to the second flat plane surface, said pull tab comprising a first hole;
   b) a plate-shaped body comprising: a planar base having a second hole extending from a top side of the base to an opposite bottom side of the base, the planar base comprising a member passage for said wedge wherein the wedge and the body interact within the member passage and the wedge slides through the member passage tip end first wherein the wedge slides from one side of the member passage to the other side of the member passage, and the member passage allows members including struts and pipes to pass, and wherein a peripheral edge of the member passage defines a contact line; and a planar retaining portion perpendicular to and spaced laterally from said base; wherein said aperture of said pull tab and said hole of said base are axially aligned; and
   c) a fastener engaged in the aligned first and second holes and connected to said pull tab wherein tightening of the fastener within the aligned first and second holes forces said tip end of said wedge through the member passage defined in the body by the contact line and said retaining portion;

wherein:
  i) the sloping flat plane surface of the wedge engages with the contact line or surface of said member passage where said sloping flat plane surface slides against said contact line or surface as the fastener is tightened between the pull tab and a corresponding point of attachment on said clamped member.

2. The wedge clamp of claim 1 wherein said fastener is a bolt.

3. The wedge clamp of claim 1 wherein said fastener is a bolt and a nut.

4. The wedge clamp of claim 1 wherein the wedge clamp is used for clamping a clamped member to a rectangular structural article comprising a flat section selected from an I-beam, H-beam, T-bar, plates, boards, bulk angles, and channels.

5. A combination of a wedge clamp for clamping a clamped member and a flat element of a rectangular structural article, said rectangular structural article selected from an I-beam, H-beam, T-bar, plates, boards, conventional angles, bulk angles, channels and other similar structural shapes comprising a flat element, and said wedge clamp comprises:
  a) a wedge comprising:
    a1) a first flat plane surface of the wedge which contacts said clamped member along a plane created at a contacting area between said first flat plane surface and said clamped member;
    a2) a sloping flat plane surface of the wedge positioned on an opposite side of the wedge to the first flat plane surface;
    a3) a tip end formed by the intersection of the first flat plane surface and the sloping flat plane surface wherein said tip end has a tip length; and
    a4) a pull tab having a second flat plane surface located opposite to the tip end and connected to the first flat plane surface, wherein the pull tab extends at an angle of from about 85 to about 120 degrees as measured from the first flat plane surface and extending from the sloping flat plane surface at the pull tab and wherein the tip end extends in a plane parallel to the second flat plane surface, said pull tab comprising a first hole;
  b) a plate-shaped body comprising: a planar base having a second hole extending from a top side of the base to an opposite bottom side of the base, the planar base comprising a member passage for said wedge and the body interact within the member passage and the wedge slides through the member passage tip end first from one side of the member passage to the other side of the member passage, and the member passage allows members including struts and pipes to pass, and wherein a peripheral edge of the member passage defines a contact line; and a planar retaining portion perpendicular to and spaced laterally from said base; wherein said aperture of said pull tab and said hole of said base are axially aligned; and
  c) a fastener engaged in the aligned first and second holes and connected to said pull tab wherein tightening of the fastener within the aligned first and second holes forces said tip end of said wedge through the member passage defined in the body by the contact line and said retaining portion,
wherein:
  i) the sloping plane surface of the wedge engages with the contact line or surface of said member passage where said sloping plane surface slides against said contact line or surface as the fastener is tightened between the pull tab and a corresponding point of attachment on said clamped member,
  ii) a point of attachment on said pull tab, which creates a pivoting force about where the contact line and the point or contact line on the sloping plane surface are in contact, causing said tip end to stay in contact with said clamped member,
  iii) the point of attachment on said pull tab is offset a greater distance from said plane created at the contacting area between said clamped member and the flat plane surface of the wedge, and
  iv) said clamped member having an opposite side to the contact of the tip end and the clamped member, wherein the opposite side of said clamped member is restrained by the retaining portion of said body, shaped to engage said clamped member, where the pivoting force squeezing said clamped member is increased as the wedge is moved through the member passage.

6. The combination of claim 5 wherein said fastener is a bolt.

7. The combination of claim 5 wherein said rectangular structural article comprises a structural flange or other flat element being clamped.

* * * * *